United States Patent [19]

Nagai et al.

[11] 4,386,259
[45] May 31, 1983

[54] ARC WELDING PROCESS USING A CONSUMABLE STRANDED WIRE ELECTRODE

[75] Inventors: Yasuhiro Nagai, Chigasaki; Toshisada Kashimura, Kamakura; Kunio Kaita, Kamakura; Tetsuro Kawaberi, Kamakura, all of Japan

[73] Assignee: Kabushiki Kaisha Kobe Seiko Sho, Kobe, Japan

[21] Appl. No.: 249,499

[22] Filed: Mar. 31, 1981

[30] Foreign Application Priority Data

Apr. 8, 1980 [JP] Japan .................................. 55-46428

[51] Int. Cl.³ ............................ B23K 9/24; B23K 9/00
[52] U.S. Cl. ............................ 219/137 R; 219/137.61; 219/137.8
[58] Field of Search .......... 219/72, 74, 137 R, 137.61, 219/137.8

[56] References Cited

U.S. PATENT DOCUMENTS 2,914,643 11/1959 Fields ................................ 219/137.8

OTHER PUBLICATIONS

Cary, "Modern Welding Technology", Prentice Hall, Englewood Cliffs, N. J., 1979, Sec. 5-5 & p. 356.

*Primary Examiner*—Elliot A. Goldberg
*Attorney, Agent, or Firm*—Oblon, Fisher, Spivak, McClelland & Maier

[57] ABSTRACT

An arc welding process using a consumable stranded wire electrode which is formed either by integrally intertwisting a plurality of wire elements substantially of the same sectional area such that the lines connecting center points of adjacent wire elements do not form a regular polygon in a sectional plane or by integrally intertwisting a plurality of wire elements of different sectional areas such that the lines connecting center points of wire elements of larger diameter do not form a regular polygon in a sectional plane wherein the consumable electrode is imparted with a bending trait and contacted with a surface on the inner periphery and at the outlet end of a conducting tip, and the arc is directed toward a center weld line to thereby obtain a stable arc.

14 Claims, 17 Drawing Figures

ARC WELDING PROCESS USING A CONSUMABLE STRANDED WIRE ELECTRODE

BACKGROUND OF THE INVENTION

(1) Field of the Invention

This invention relates to an arc welding process using a consumable stranded wire electrode consisting of a plural number of intertwined wire elements, and more particularly to a narrow gap arc welding process ensuring high arc stability.

(2) Description of Prior Art

Consumable wire electrodes for arc welding in most cases use a wire of round cross section, which because of the stiffness of the arc produces high penetration depthwise of the beveling gap but not so much in lateral regions of molten pool, resulting in incomplete fusion to lateral wall surfaces of the gap. For the purpose of eliminating this problem, the applicants developed and proposed in their prior application (Japanese Patent Publication No. 19542/78) a technique of uniformalizing the penetration in the welding gap as a whole by the use of a consumable stranded wire electrode which is formed either by intertwining a plural number of wire elements substantially of the same cross-sectional area such that the lines connecting the center points of adjacent wire elements would not form a regular polygon in a sectional plane, or by integrally intertwining a plural number of wire elements of different diameters such that the lines connecting centers of wires of larger diameter would not form a regular polygon in a sectional plane. The stranded wire electrode has an effect of uniformalizing the depth of penetration in the entire regions of the welding gap since the arc-generating point is shifted every moment and individual wire elements are directed toward the side wall surfaces of the gap, coupled with the arc deflections occurring under the influence of the magnetic field which is generated by current conduction through the electrode wire. This and related techniques are discussed in an article entitled "Narrow-Gap Gas Metal Arc Welding Process in Flat Position", Welding Journal, July 1979. pp 44–52.

However, it has been confirmed that the stranded wire which contains surface irregularities inherently has a reduced surface area for contact with a conducting tip and causes abrasive wear to the inner surface of the conducting tip in an increased amount as compared with an ordinary round wire. Therefore, the surface area for contact with the conducting tip is reduced all the more, inviting troubles of conduction failure more frequently. Besides, as will be discussed in greater detail hereinafter, the point of contact between the outer surface of the wire and the inner surface of the conducting tip is apt to be shifted, imposing an adverse effect on the arc stability. Moreover, there is a problem in that the direction of the tip end of the wire is varied sequentially depending upon the extent of residual stress resulting from the prior wire stranding operation.

Thus, the consumable stranded wire electrode still leaves room for improvements in the operation aspects.

SUMMARY OF THE INVENTION

Under these circumstances, the present invention, has been achieved as a result of extensive studies directed to the improvements of the welding process using a consumable stranded wire electrode. More particularly, the present invention concerns an arc welding process using a consumable stranded wire electrode which is formed either by integrally intertwisting a plural number of wire elements substantially of the same cross-sectional area such that the lines connecting center points of adjacent wire elements in section do not form a regular polygon in a sectional plane or by integrally intertwisting a plural number of wire elements of different cross-sectional areas such that the lines connecting center points of wires of larger diameter do not form a regular polygon in a sectional plane. A feature of the present invention resides in that the consumable stranded wire electrode is imparted with a bending trait or aptitude to let the wire contact the conducting tip constantly at a point in the vicinity of its outlet end and the arc is directed substantially toward the center line of the weld to be formed.

The above and other objects, features and advantages of the present invention will become apparent from the following description and the appended claims, taken in conjunction with the accompanying drawings which show by way of example preferred embodiments of the present invention.

DESCRIPTION OF PREFERRED EMBODIMENTS

Figure 1:
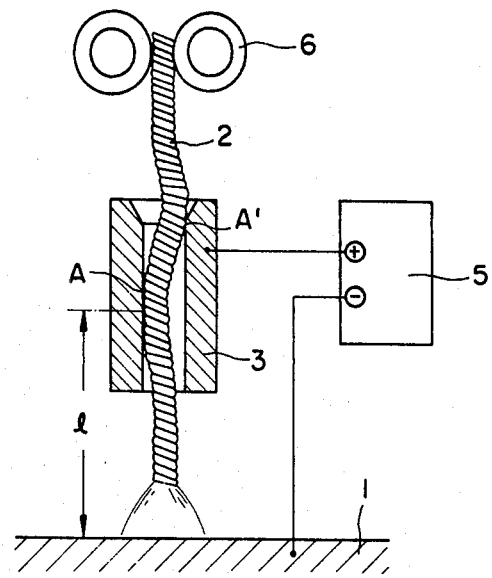
FIG. 1 is a schematic illustration of a prior art welding process.

Referring to FIG. 1, there is schematically shown a conventional welding process using a stranded wire electrode, in which a wire 2 is fed toward a workpiece 1 through a conducting tip 3 by rotation of a pair of feed rollers 2. Electric current is supplied from a power source 5 to generate an arc between the wire 2 and workpiece 1, thereby continuously melting and consuming the wire 2. In the conventional welding process, the wire 2 which is not imparted with a particular bending trait beforehand is usually bent in S-shape by the resistance which is imposed on the wire upon passage through the conduction tip 3. In such a case, the wire 2 and tip 3 are contacted with each other at two points A and A' for conduction therethrough of welding current. The number of contact points is increased with a longer tip 3 or in a case where the wire 2 is bent in a smaller pitch. If welding operation is carried on in such a state, the contact points A and A' are shifted toward the fore end of the tip 3 due to consumption of the wire 2. It follows that the distance between the workpiece 1 and the contact point A closer to the workpiece 1 is varied in every moment, causing variations in the amount of resistance heat generation in the wire portion forward of the contact point A. As a result, the melting speed of the wire 2 is varied, making it difficult to maintain a constant arc. Further, when the contact point A comes out of the tip 3, the conduction is abruptly limited to the contact point A', so that the distance between the workpiece 1 and a nearmost contact point is suddenly increased, affecting the stability of the arc to a considerable degree. This phenomenon is repeated by short cyclic periods, and the arc loses stability especially when the pitch of bends in the wire is irregular. Moreover, the inner surface of the tip 3 is susceptible to abrasion by contact with the surface irregularities on the outer periphery of the wire 2. In case the inner diameter of the tip 3 is increased by abrasion, the trouble of contacting failure which is detrimental to the stability of the arc occurs more frequently.

Figure 2:
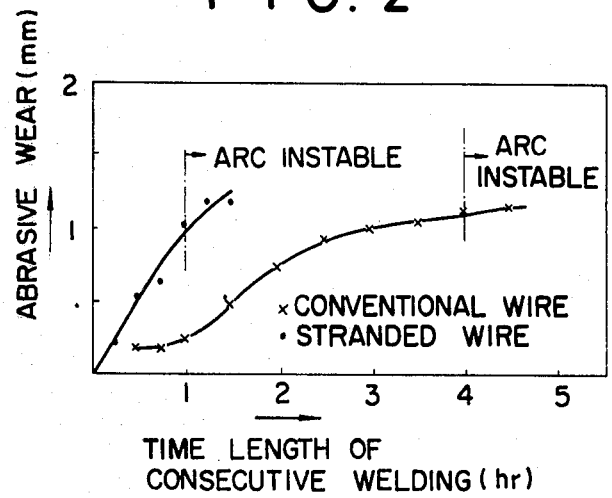
FIG. 2 is a graphic illustration showing the amount of abrasive wear of the welding tip in consecutive arc welding.

FIG. 2 illustrates the relations between the abrasion of the inner wall surface of the conduction tip and the arc stability in consecutive welding operations using an ordinary solid wire of round cross-section (4.0 mm$\phi$) and a stranded wire consisting of two 2.0 mm$\phi$ wire elements. It is seen that the solid round wire permits consecutive welding operations for about four hours in contrast to the stranded wire with which it becomes difficult to continue the operation due to considerably unstable state of the arc after about one hour's consecutive welding operation.

Figure 3:
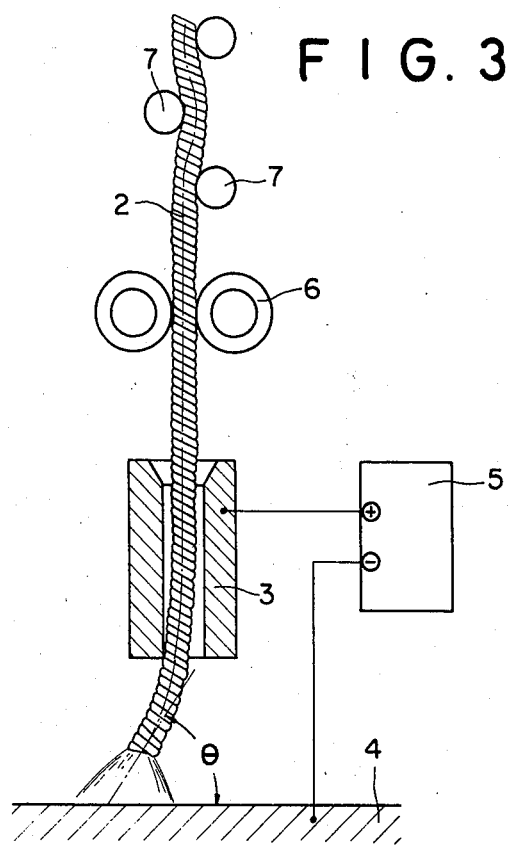
FIG. 3 is a schematic illustration of an arc welding process according to the present invention.

Nevertheless, the arc of a stranded wire electrode can be maintained in stable state according to the welding process of the present invention which is schematically illustrated in FIG. 3. More particularly, in this particular embodiment, rectifying rollers 7 are located on the upstream side of the feed rollers 6 thereby removing irregular bends from the wire 2 and at the same time imparting thereto a bending trait in a particular direction. By so doing, the wire 2 which is fed through the conduction tip 3 is abutted against a surface on the inner periphery of the tip 3 at its fore outlet end and therefore restrictedly deformed within a range of its resiliency, running through the tip 3 in a rectilinear form. The fore end portion of the wire 2 which has left the conduction tip 3 is held in unrestricted state so that it restores the bending trait and turns toward a predetermined direction. In this instance, the wire 2 is constantly contacted with the inner periphery of the conduction tip 3 at the fore end thereof and pressed thereagainst by the resiliency of the wire 2 itself. Consequently, there occur no shifts of the contact point nor conduction failures due to abrasive wear of the inner wall surface of the conduction tip. In order to uniformalize the penetration over the entire gap width, the tip end of the wire 2 should be directed toward the center of the gap. That is to say, the wire 2 should be imparted with a bending trait such that the arc is directed substantially toward the center line of the weld to be formed.

Figure 4:
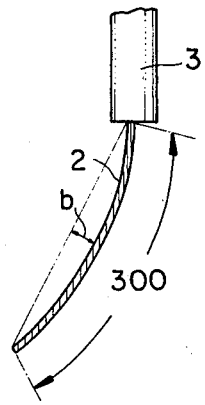
FIG. 4 is a schematic illustration explanatory of a method for measuring the bending trait of a wire.
Figure 5:
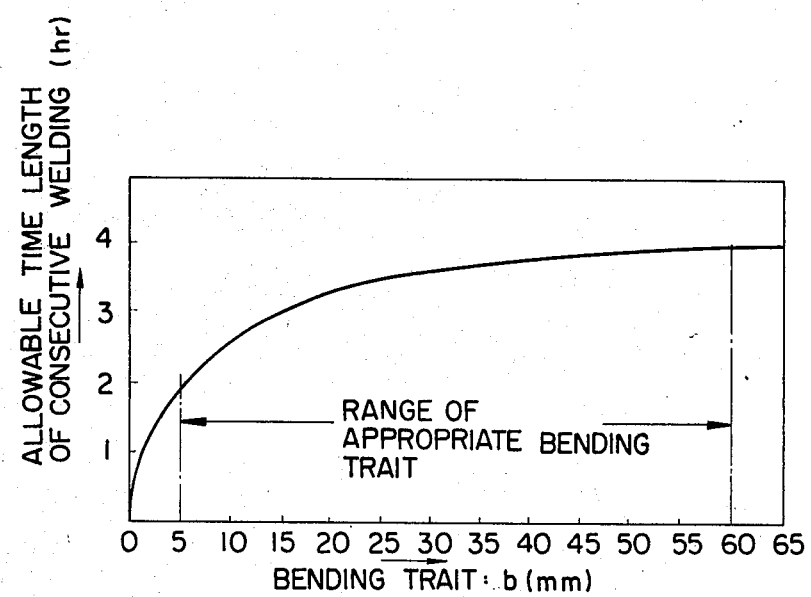
FIG. 5 is a graphic illustration showing an appropriate range of bending trait against allowable time length of consecutive welding.

The degree of bending trait is determined suitably depending upon the wire diameter and the inner diameter and length of the conduction tip, but preferred to have an amplitude b in the range of 5–60 mm when measured by a method illustrated in FIG. 4. FIG. 4 illustrates a method for measuring the degree of the bending trait, in which an arcuately bent fore end portion of the wire 2 which is extruded through the conduction tip 3 is cut into a segment of 300 mm in length and the maximum height or amplitude on a chordal line connecting the opposite ends of the segment is measured. The degree of bending trait is smaller with a smaller amplitude b and greater with a greater amplitude b. FIG. 5 illustrates the amplitude b of bending trait, measured by the above-described method, in relation with the time of consecutive welding operation. In this connection, the smallest unit among the commercially available wire coils is about 20 kg, which is burned off in about 2 hours. Therefore, there occurs no problem in the actual operation as long as the arc stability is maintained at least for that time period. It will be seen from FIG. 5 that the degree of bending trait should be greater than 5 mm in order to maintain the arc stability for a time period longer than 2 hours. However, with an amplitude b greater than 60 mm, the wire exhibits a considerably large bend after leaving the conduction tip, forming a smaller angle $\theta$ (FIG. 4) with the workpiece. As a result, the filler metal is blown off by the force of arc, making it difficult to obtain a sound bead. In addition, the wire imposes an increased pressure on the tip, encouraging abrasive wear in a particular locality on the inner periphery at the fore end of the tip. These problems can be solved easily by providing a conductive wear resistant material on the inner periphery at the fore end of the tip or by refreshing the tip from time to time by cutting off abrased fore end portions.

Thus, it is possible to use the stranded wire without inviting shifts of the contact point or without contact failures, while maintaining the stability of arc over a long time period and enhancing practical values of the stranded wire.

The foregoing embodiment of the invention is illustrated more particularly by the following example.

EXAMPLE 1

Cylinders having a wall thickness of 100 mm and an outer diameter of 1,100 mm were joined by circumferential butt welding with use of a consumable stranded wire electrode consisting of two 2.0 mm$\phi$ wire elements. Welding conditions

| | |
|---|---|
| Beveling shape: | I-type (with a gap of 14–16 mm) |
| Shielding gas: | 80% Ar + 20% $CO_2$ |

| | |
|---|---|
| -continued | |
| Welding current: | 500–550A |
| Welding voltage: | 31–32V |
| Welding speed: | 25–35 cm/min. |

During the welding operation, the wire was imparted with a bending trait b=15 mm toward the weld line. The arc became instable only just once during one round of welding operation. A radiographic inspection revealed that the imperfection rate (defective length/total weld length×100) was as small as 0.2%.

In contrast, in a welding operating using a wire without bending trait, the arc lost stability 14 times during one round of welding and the imperfection rate of the resultant welded joint was as high as 35%.

It is clear from these experimental results that the arc is stabilized to a considerable degree in the welding process according to the present invention, contributing to the enhancement of the welding efficiency and reduction of joint defects in addition to the arc stabilization.

From further studies using materials which are more susceptible to cracking like high carbon steel and Cr-Mo steel, it has been known that cracks are produced in some cases when excessively large welding current is employed for the purpose of increasing the welding efficiency.

Therefore, our studies were extended not only to workpieces of ordinary welding materials but also to those materials which are liable to weld cracks to permit application thereto of the narrow-gap welding process with the consumable stranded wire electrode, ensuring formation of crackfree high quality joints in either case. As a result, it has been found that this object can be achieved by setting the welding speed, the feed angle of the consumable electrode and the shielding gas composition respectively in particular ranges.

In narrow-gap arc welding using a stranded wire electrode consisting of a plural number of intertwisted wire elements, it is preferred to set the welding current in the range of 450–500 A, the welding speed in the range of 15–23 cm/min, and the forward inclination angle of the consumable electrode in the range of 5°–10°, and to use a shielding gas mixture consisting of argon and 2–15% of $CO_2$ or oxygen.

The shielding gas of that particular composition serves to stabilize the welding arc and finely divide the transferred droplets of molten metal while reducing depthwise penetration coupled with reductions in the welding current and speed. Simultaneously, by adjustment of the feed angle of the consumable electrode, precocious transfer of the molten metal due to the reduction of the welding speed is suitably prevented, guaranteeing crack-free narrow-gap welded joints of extremely high quality.

Figure 6:
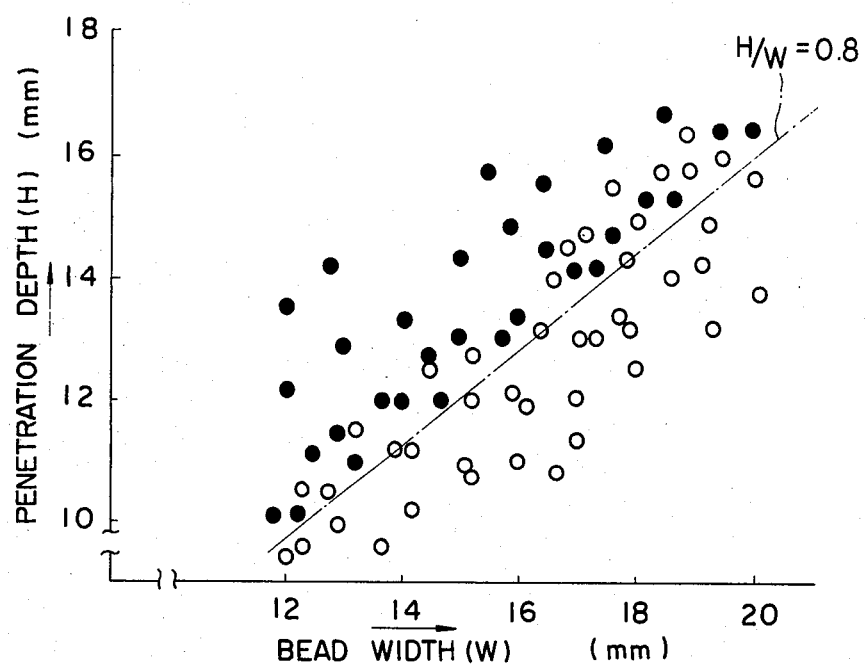
FIG. 6 is a graphic illustration of the conditions under which weld cracks are produced.

Referring to FIGS. 6 through 13, the limitations which are adopted in this embodiment are determined for the following reasons. Based on a finding of the close relation between the bead cracking and the depth of penetration relative to the bead width, we looked into the relationship between the sectional bead shape and the occurrence of cracking. More particularly, FIG. 6 illustrates the results of experiments of narrow-gap welding using a consumable stranded wire electrode of two intertwisted welding wires of 2 mm in diameter, confirming presence or absence of a crack in relation with the ratio of the depth of penetration to the bead width. Here, blank and solid black circles "o" and "●" indicate absence and presence of a crack, respectively. As clear from these results, when H/W is less than 0.8, cracking does not occur in any case. Namely, it is considered that, if H/W is less than 0.8, that is to say, if the sectional shape of the bead is broader in width, the molten metal has a final solidifying point at a level close to the bead surface, preventing seggregation of impurities in the middle portion of the bead. Therefore, bead cracking can be securely prevented by adjusting the welding conditions in such a manner as to hold H/W less than 0.8.

Figure 7:
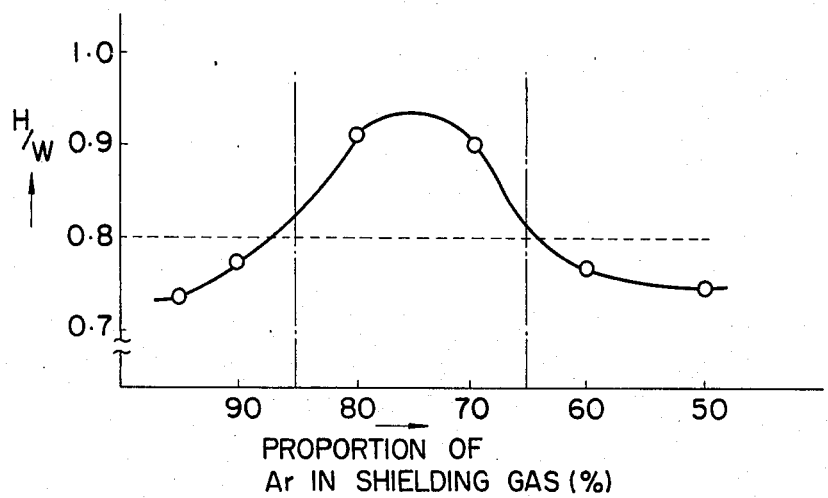
FIG. 7 is a graphic illustration of relations among the argon content in the shielding gas, penetration depth (H) and bead width (W)

In order to define the welding conditions which can hold H/W at a value smaller than 0.8, it is necessary to determine correct ranges of the shielding gas composition, welding current and welding speed. To this end, the relations between the argon content in the shielding gas mixture of argon and carbon dioxide or oxygen and the ratio H/W were examined as illustrated in FIG. 7. As clear from the results given there, the value of H/W exceeds 0.8 when the argon proportion in the shielding gas is in the range of 65–85% but drops below 0.8 with an argon content over or under that range, although the arc becomes instable with an argon content less than 65% owing to increases in size of transferred molten droplets, resulting in extremely increased spattering. The argon content in the shielding gas mixture should therefore be greater than 85% in order to maintain appropriate welding conditions while suppressing H/W below 0.8. The stability of arc is extremely disturbed when the quantity of carbon dioxide or oxygen to be mixed with Ar is less than 2%. Consequently, generally speaking, the additive quantity of carbon dioxide or oxygen should be in the range of 2–15%.

Figure 8:
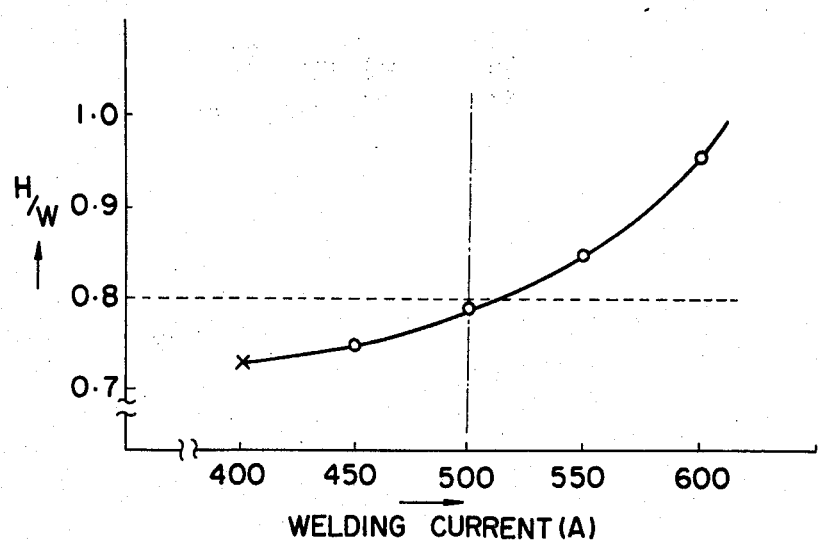
FIG. 8 is a graphic illustration of relations between H/W ratio and welding current.
Figure 9:
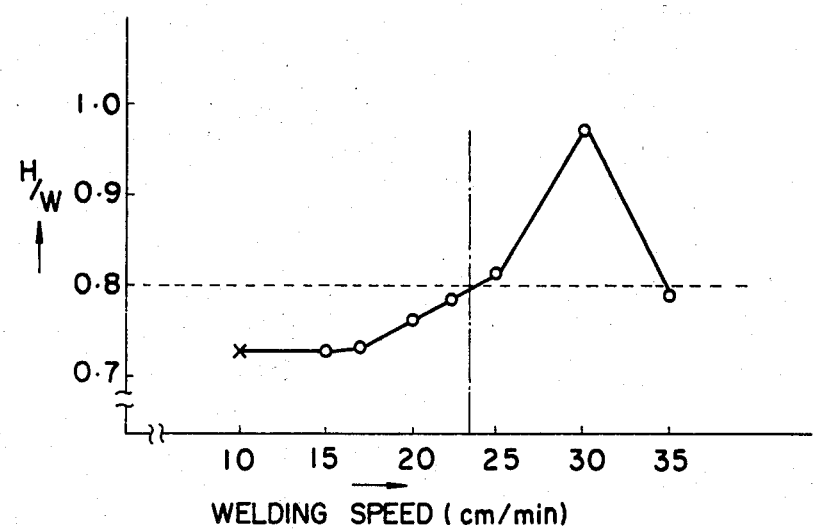
FIG. 9 is a graphic illustration of relations between H/W ratio and welding speed.

Observations were also made of the relations of the welding current and speed with the value of H/W, using a shielding gas mixture of 90% Ar and 10% $Co_2$. FIG. 8 graphically illustrates the relation between the welding current and the value of H/W, in which is seen that higher welding current is reflected by greater penetration depth and increased value of H/W. The graph shows that, in order to suppress H/W below 0.8, the welding current should be smaller than 500 A. However, with a welding current smaller than 450 A, the stability of arc is disturbed extremely due to low current as compared with the sectional area of the consumable electrode. Therefore, a practically appropriate range of the welding current is 450–500 A. FIG. 9 illustrate the relation between welding speed and H/W, from which it is understood that the welding speed should be lower than 23 cm/min in order to suppress the value of H/W below 0.8. However, a welding speed lower than 15 cm/min causes precocious transfer of molten metal and gives rise to a tendency toward incomplete fusion in the vicinity of intersections of bottom and side surfaces of the beveling. Therefore, a practically appropriated welding speed is in the range of 15–23 cm/min.

Figure 10:
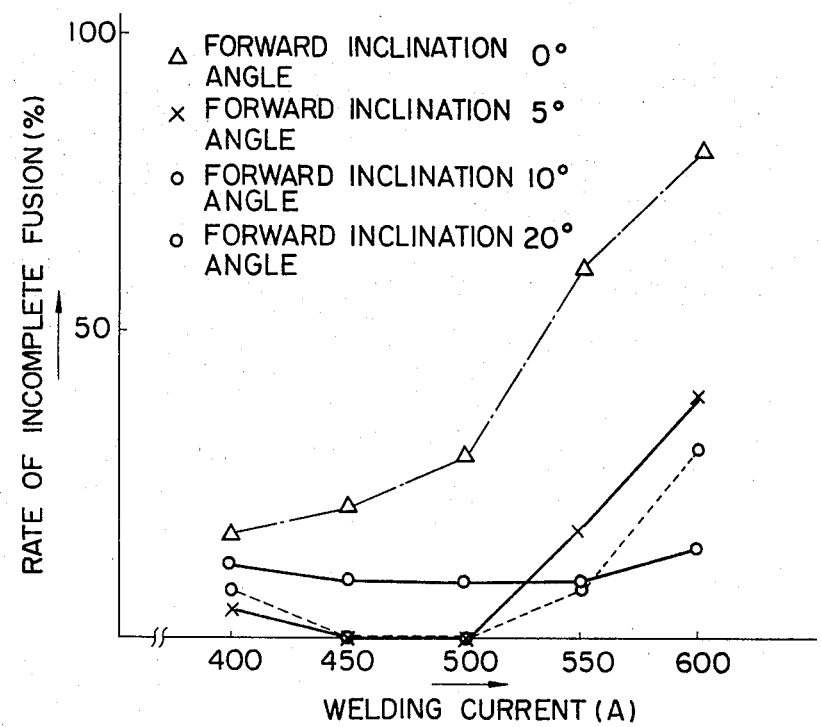
FIG. 10 is a graphic illustration of relations between forward inclination angle of the electrode and rate of penetration failures.

In the foregoing embodiment which employs a relatively low welding speed, it cannot be denied that there is a tendency toward incomplete fusion due to precocious transfer of molten metal. This problem, however, can be eliminated easily by adjusting the feed angle of the consumable electrode. More particularly, FIG. 10 illustrates the relation between the welding current and the rate of incomplete fusion in those cases employing a shielding gas of 90%Ar+10%$CO_2$ and a welding speed of 15 cm/min and where the forward inclination angle of the consumable electrode is varied over a certain range. It is seen therefrom that the rate of incomplete fusion is varied considerably even under the same welding conditions depending upon the forward inclination angle of the electrode. The incomplete fusion cannot be avoided by adjustment of the welding current in a case the forward inclination angle is 0° (the electrode is fed perpendicularly to the bottom surface of beveling) or greater than 20° (the electrode is fed and advanced forming an angle of 70° with the bottom surface of beveling on the side adhead of a currently working point). However, with a forward inclination angle in the range of 5-10°, insufficient fusion can be completely eliminated in a welding current range of 450-500 A. Namely, the electrode should be fed with a small forward inclination angle for the purpose of preventing precocious transfer of molten metal, but a too large forward inclination angle tends to blow off the molten metal on the side posterior to the currently welded point, rather encouraging incomplete fusion. Therefore, the forward inclination angle should be in the range of 5-10°. In this connection, for the adjustment of the forward inclination angle, it is possible to tilt a contact tip which applies current to the electrode or to impart a forwardly bending trait to the electrode itself as mentioned hereinbefore. However, there may be employed any other means if desired.

Figure 11:
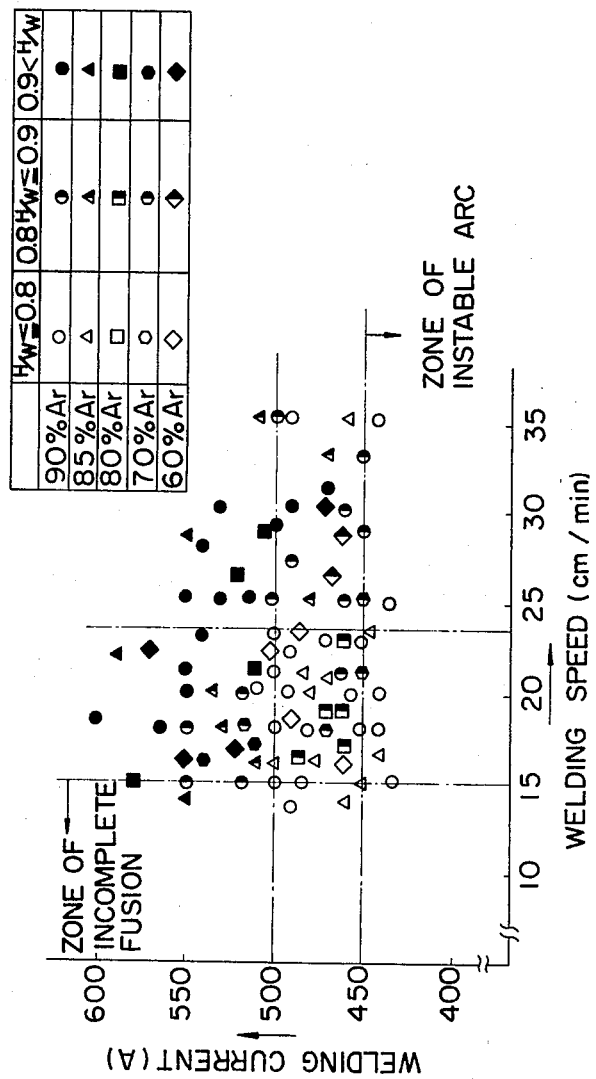
FIG. 11 is a graphic illustration of relations among welding current, welding voltage, shielding gas composition and H/W ratio in a case where the wire has a forward inclination angle of 5°.

FIG. 11 illustrates overall relations among the welding current, welding voltage, shielding gas composition (proportion of Ar) and value of H/W in welding operations where the forward inclination angle of the consumable electrode is set at 5°. It will be understood therefrom that the value of H/W can be suppressed below 0.8 by employing welding conditions which satisfy the above-discussed requirements.

Thus, in the foregoing embodiment, the defects of incomplete fusion is prevented while maintaining stability of the arc by restricting the welding current, welding speed and shielding gas composition to the respective appropriate ranges and feeding the electrode with a predetermined forward inclination angle, ensuring formation of crack-free high quality narrow-gap joints. It is to be understood that, as long as the above-discussed conditions are satisfied, the present invention is not subject to limitations in other respects, for example, the kind of the stranded wire elements (e.g., solid wires, composite wires or a combination thereof), their sectional shape (e.g., round, square or a combination thereof), their diameter (e.g., large gage wires, small gage wires or a combination thereof) or the number of plying wires or any other conditions whatsoever, permitting applications of diversified kinds of stranded wire electrodes, and variations or alterations in these aspects fall in the technical boudaries of the present invention. According to the present invention, the stranded wire electrode is preferred to have a sectional area smaller than 9.1 mm$^2$ since a wire with a greater sectional area would instabilize the transfer of molten droplets to the workpiece by enlarging their particle sizes and increase the spattering to a practically objectionable degree. In the present invention, however, it is preferred to uniformalize the widthwise penetration in the beveling by utilizing rotational and deflective movements of the arc inherent to stranded wire electrode, adjusting the twisting pitch or angle of the individual wire elements according to the beveling width. The diameter of rotational and deflective movements of arc becomes greater with a larger twist angle of the wire elements and inversely becomes smaller with a smaller twist angle. If the diameter of the rotational and deflective movements of arc is too large relative to the beveling gap width, a great undercut is produced on the side wall of the beveling, permitting slag to intrude and solidify there to form slag inclusions without completely melting and flatting up in the next pass. On the other hand, if the diameter of the rotational and deflective movements of arc is too small relative to the beveling gap width, the arc heat fails to reach the intersecting areas of the bottom and side walls, resulting in complete fusion. It is therefore necessary to select an optimum diameter of the rotational and deflective movements of arc according to a particular beveling gap width, in consideration of the relation between the twist angle of the wire elements and the beveling gap width as briefly discussed hereinlater.

Figure 12:
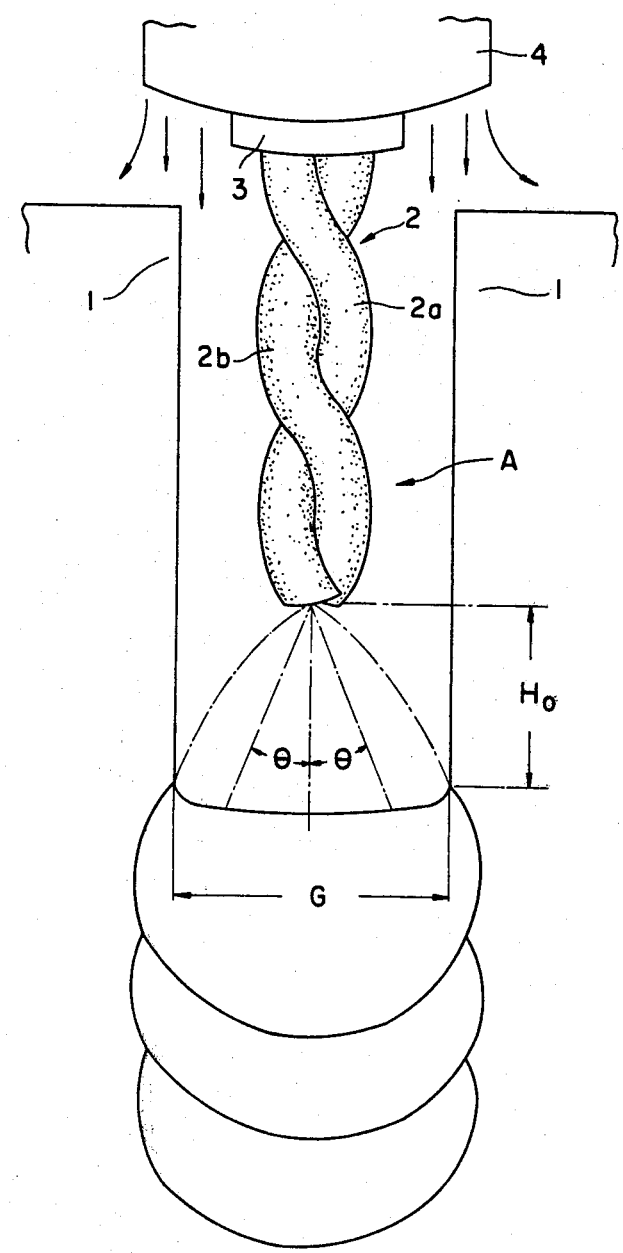
FIG. 12 is a schematic illustration of welding conditions according to the present invention.
Figure 13:
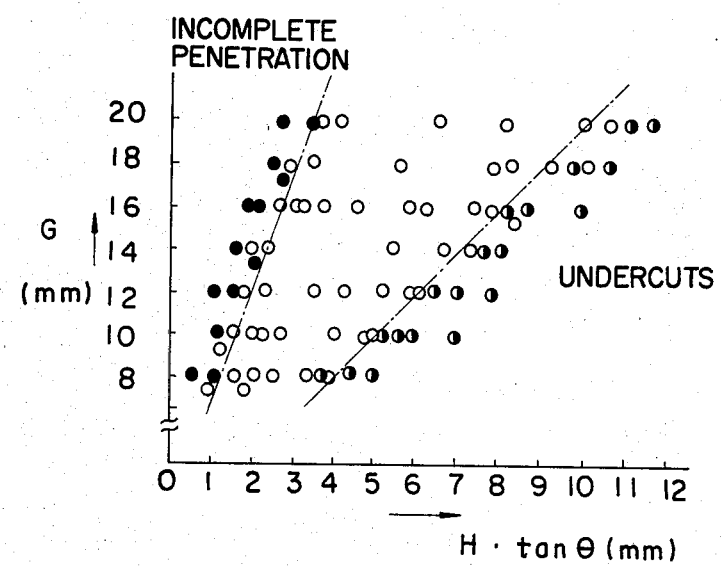
FIG. 13 is a graphic illustration of relations between $H_o \cdot \tan \theta$ and G, where $H_o$ stands for the arc extension, $\theta$ for the twist angle of wires and G for the gap width.

FIG. 12 schematically illustrate a welding operation incorporating the present invention, in which the arc is advanced toward the upper side of the figure and where indicated at A is a beveling, at 1 workpieces, at 2 a consumable stranded wire electrode consisting of intertwisted wire elements $2a$ and $2b$, at 3 a conducting contact tip, and at 4 a shielding gas nozzle. Here, the gap width of the beveling is expressed by G, the twist angle of the respective wire elements $2a$ and $2b$ of the consumable electrode 2 by $\theta$, and the depthwise distance between the tip end of the consumable electrode and the intersecting point of the bottom and side surfaces by $H_o$. Our studies on the conditions for obtaining a sound joints in connection with these three factors revealed that there is close relation between the values of G and $N_o \cdot \tan \theta$, the diameter of arc rotation. More particularly, as mentioned hereinbefore, a too small diameter of arc rotation relative to the beveling gap width G will result in insufficient penetration, while a too large diameter of arc rotation will cause a tendency toward undercut (slag inclusions). However, as clear from FIG. 13, extremely sound joints free of insufficient penetration and undercut can be obtained by employing conditions which satisfy the relationship of $G/2 \geq H_o \cdot \tan \theta \geq G/6$. Although a consumable electrode consisting of two wire elements is used in the example given above, differences in the shape, dimensions and number of the wire elements can be compensated by suitably varying the twist angle (pitch of twist).

In summary, the welding process according to the present invention permits to form a sound narrow-gap welded joint even with workpieces of a material which is susceptible to cracking like high carbon steels and Cr-Mo steels, by holding the values of welding current, welding speed, shielding gas composition and forward inclination angle of the electrode in predetermined appropriate ranges, while preserving the inherent features of the stranded wire electrode.

Above-described embodiment is illustrated more particularly by the following Examples of the invention and Comparative Examples.

EXAMPLE 2

A downhand butt joint of thick steel plates of ASTEM A 387 Gr 22 was welded by narrow-gap arc welding using a consumable stranded wire electrode consisting of two 2.0 mm$\phi$ wire elements, under the following conditions.

| | |
|---|---|
| Base metal: | ASTM A387 Gr22 (100 mm thick) |
| Consumable electrode: | Two MIG wires (2.0 mm $\phi$) for |

| | |
|---|---|
| | 2¼ Cr-1Mo steel |
| Shielding gas: | Ar + 10% $CO_2$ |
| Gap width: | 13-15 mm |
| Welding current: | 490A |
| Arc voltage: | 31V |
| Welding speed: | 20-23 cm/min |
| Wire twist angle ($\theta$): | 33° |
| Tip distance ($H_o$): | 6 mm |

Inspection of the resulting joint by magnetic dust flaw detection, X-ray examination and ultrasonic flaw detection confirmed soundness of the joint, free of defects such as cracks or the like.

EXAMPLE 3

A downhand butt joint of thick steel plates of JIS SB49 was welded by narrow-gap arc welding using a consumable electrode consisting of two intertwisted 2.0 mm$\phi$ and 1.6 mm$\phi$ wire elements, under the following conditions.

| | |
|---|---|
| Base metal: | JIS SB49 (120 mm thick) |
| Consumable electrode: | 50 kg/mm² MIG wires (2.0 mm $\phi$ + 1.6 mm $\phi$) for steels |
| Shielding gas: | Ar + 15% $CO_2$ |
| Gap width: | 13-14 mm |
| Welding current: | 480A |
| Arc voltage: | 30V |
| Welding speed: | 20-22 cm/min |
| F. inclination angle: | 5° |
| Twist angle: | 33° |
| Tip distance ($H_o$): | 6 mm |

X-ray inspection and crosswise bending test of the resulting joint confirmed extremely high soundness of the joint, free of defects such as cracking, incomplete fusion, slag inclusions and the like.

COMPARATIVE EXAMPLE 1

A downhand joint of thick steel plates with a continously varying gap width was welded with use of a consumable electrode consisting of two intertwisted 2.0 mm$\phi$ wire elements and varying the distance between the tip end of the consumable electrode and an intersecting point of bottom and side surfaces of the beveling under the following conditions.

| | |
|---|---|
| Base metal: | ASTM A387 Gr22 (190 mm thick) |
| Consumable electrode: | Two MIG wires (2.0 mm $\phi$) for 2¼ Cr-1Mo steel |
| Shielding gas: | Ar + 10% $CO_2$ |
| Gap width (G): | 10 → 18 mm |
| Welding current: | 500A |
| Arc voltage: | 29 → 31V |
| Welding speed: | 30 cm/min |
| F. inclination angle: | 0° |
| Twist angle: | 33° |
| Tip distance ($H_o$): | 3 → 7 mm |

X-ray inspection and crosswise bending test of the resulting joint confirmed its soundness, free of defects such as incomplete fusion, slag inclusions and the like. However, slight hot cracking was observed in 1-4 passes.

COMPARATIVE EXAMPLE 2

A downhand joint of thick steel plates with a continuously varying gap width was welded by means of a consumable electrode consisting of two 2.0 mm$\phi$ wire elements intertwisted with different twist angles, maintaining a constant distance ($H_o$) between the tip end of the electrode and an intersecting point of bottom and side surfaces of the beveling under the following conditions.

| | |
|---|---|
| Base metal: | ASTM A516 Gr70 (150 mm thick) |
| Consumable electrode: | Two 50 kg/mm² MIG wires (2.0 mm $\phi$) for steel |
| Shielding gas: | Ar + 20% $CO_2$ |
| Gap width (G): | 12 → 18 mm |
| Welding current: | 510A |
| Arc voltage: | 29 → 30V |
| Welding speed: | 28 cm/min |
| Wire twist angles ($\theta$): | 30° & 15° |
| Tip distance ($H_o$): | 6 mm |

X-ray inspection and crosswise bending test of the resulting joint confirmed its soundness, free of defects such as incomplete fusion, slag inclusions or the like. However, slight hot cracking was observed in 1-4 passes.

COMPARATIVE EXAMPLE 3

A downhand narrow gap joint of thick steel plates with a continously varying gap width was welded by the use of a consumable electrode consisting of two 2.0 mm$\phi$ wire elements, maintaining a constant distance ($H_o$) between the tip end of the electrode and an intersecting point of bottom and side surfaces of the beveling under the following conditions.

| | |
|---|---|
| Base metal: | ASTM A516 Gr70 (150 mm thick) |
| Consumable electrode: | Two 50 kg MIG wire (2.0 mm $\phi$) for steels |
| Shielding gas: | Ar + 20% $CO_2$ |
| Gap width: | 12 → 16 mm |
| Welding current: | 550A |
| Arc voltage: | 32V |
| Welding speed: | 30 cm/min |
| F. inclination angle: | 33° |
| Tip distance ($H_o$): | 6 mm |

X-ray inspection and crosswise bending test of the resulting joint confirmed its soundness, free of defects such as incomplete fusion, slag inclusions and the like. However, slight high temperature cracking was observed on the bead surface in 1-4 passes. The cracks, however, were completely remelted and extinguished in a succeeding pass, so that no trace of their existence was observed in the finally obtained joint in any form whatsoever.

COMPARATIVE EXAMPLE 4

A downhand narrow-gap joint of high gage steel plates with a continuously varying gap width was welded by the use of a consumable electrode consisting of two intertwisted 2.0 mm$\phi$ wire elements, maintaining a constant distance ($H_o$) between the tip end of the consumable electrode and an intersecting point of bottom and side surfaces of the beveling under the following conditions.

| | |
|---|---|
| Base metal: | ASTM A516 Gr70 (150 mm thick) |
| Consumable electrode: | Two 50 kg/mm² MIG |

-continued

| | wires (2.0 mm φ) for steels |
|---|---|
| Shielding gas: | Ar + 20% CO$_2$ |
| Gap width: | 12 → 18 mm |
| Welding current: | 550A |
| Arc voltage: | 32V |
| Welding speed: | 30 cm/min |
| F. inclination angle (θ): | 0° |
| Wire twist angle: | 21° |
| Tip distance (H$_o$): | 5 mm |

X-ray inspection and crosswise bending test revealed the resulting joint to be defective, showing incomplete fusion to the side surface of the beveling more conspicuously at greater gap widths. Also, high temperature cracking was observed on the bead surface in 1–5 passes.

In another embodiment of the present invention, which will be described hereinafter, there is provided effective means for preventing which would be caused when relatively large current is applied using a stranded wire electrode consisting of two or more wire elements.

High temperature cracking often occurs in the initial or second layer depending upon the nature of base metal. This is because, when forming a weld in a narrow gap with relatively large current, the bead tends to take a form which is more elongated in depthwise direction of the gap than in widthwise direction, producing the so-called pear-shape cracks in the middle portion of the bead. High carbon steels and Cr-Mo steels are more liable to hot cracking than other kinds of steels as in the case of ordinary submerged arc welding. With regard to the position of the hot cracking, it occurs most frequently in the initial layer of welding and nextly in the second layer and seldom occurs in the third or subsequent layers.

In view of that trend of hot cracking, it is considered that a primary cause of the crack is the dilution of the base metal by the penetration into the bottom wall of the beveling. Therefore, when welding a steel material which is liable to hot cracking, it is necessary to select welding conditions which have less influence the chemical composition of the steel material, for example, a lower welding current. However, mere lowering of the welding current causes a change in the transfer of molten metal, from spray transfer to globule transfer, producing spatters in an increased degree and as a result making the welding operation difficult due to deposition of spatters on the beveling surfaces and jigs such as gas nozzles.

In this regard, when the pulsed current is used, as welding is feasible with a current at 70% of the critical value for the spray transfer, it serves to reduce the penetration into the bottom portion of the beveling and thus to stop high temperature cracking. Besides, spattering is suppressed, precluding the problem of clogged shielding gas nozzles to allow consecutive welding operations over a long time period.

Figure 14:
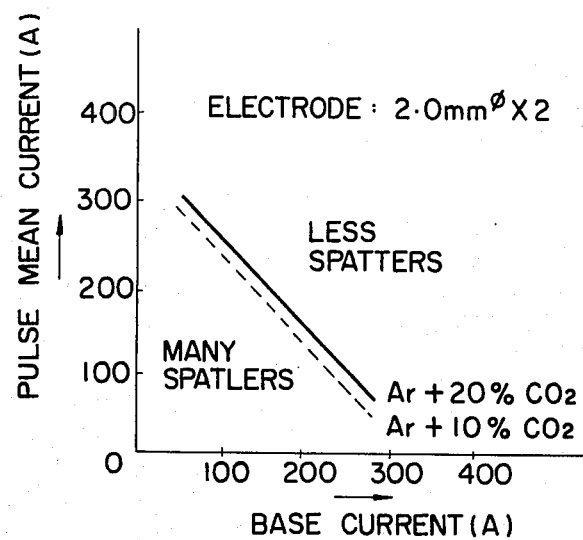
FIG. 14 is a graphic illustration of relations between the degree of spattering and pulsed welding current.

FIG. 14 illustrates the high temperature cracks which are produced in the middle portion of the bead in a welding operation using constant direct current instead of pulsed current. Looking into the degree of spattering in relation with the base current value and mean current value in pulsed current for a case using an electrode of two intertwisted 2.0 mmφ wire elements, it has been found that the molten metal transfer turns into a spray when the effective value of pulsed current (mean pulsed current + base current) exceeds 350 A in an experiment using a shielding gas composition of 80%Ar+20%CO$_2$ (spattering is considerably increased at a value lower than 480–500 A with ordinary direct current), and when the effective value of pulsed current exceeds 330 A in an experiment using a shielding gas composition of 90%Ar+10%CO$_2$ (spattering is considerably increased at a value lower than 460–480 A with ordinary direct current). On the other hand, in a case using an electrode of two intertwisted 1.6 mmφ wire elements, spattering is reduced at an effective value of current larger than 250 A for a shielding gas composition of 80%Ar+20%CO$_2$ and at an effective value of current larger than 230 A for a shielding gas composition of 90%Ar+10%CO$_2$. The pulsed current may have a rectangular waveform or a waveform akin to sine wave.

Figure 15:
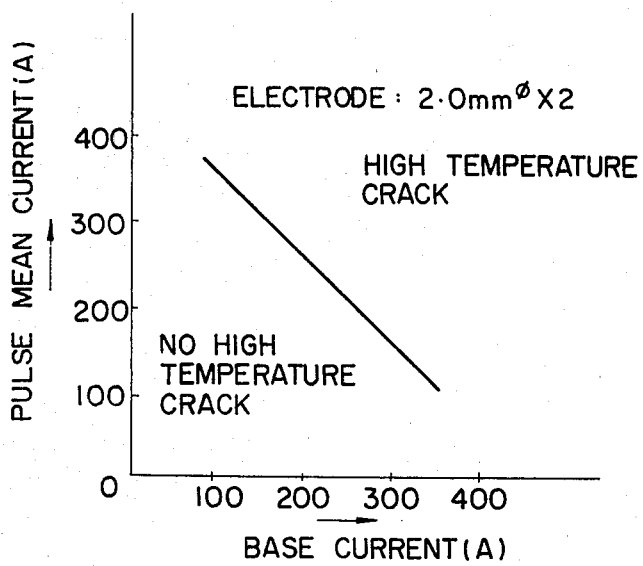
FIG. 15 is a graphic illustration of relations between liability of high temperature cracks and pulsed welding current.

Based on the foregoing experimental data on the extent of spattering, FIG. 15 shows by way of example the results of an experiment conducted to see a trend toward high temperature cracking in pulsed current welding of a high carbon steel (0.28%C) which is considered to be most liable to high temperature cracks.

It is seen therefrom that in a case of a stranded wire of two 2.0 mmφ wire elements, no high temperature cracks are observed at an effective current value smaller than 450 A. In a case using a stranded wire of two 1.6 mmφ wire elements, high temperature cracks are not traced at an effective current value lower than 350 A. The relation between the value of pulsed current and the high temperature cracking was studied by experiments using a stranded wire of two 2.0 mmφ wire element for beveling gaps of 12–18 mm and a stranded wire of two 1.6 mmφ wire elements for gaps of 8–14 mm.

Figure 16A:
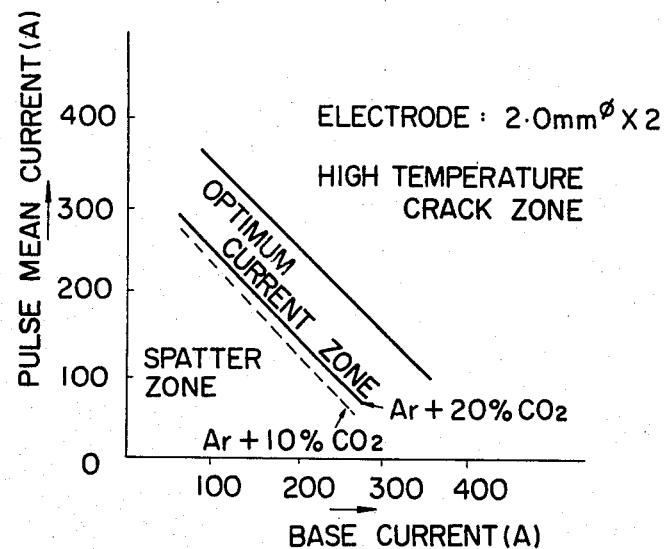
FIGS. 16(a) and 16(b) are graphic illustrations of optimum pulsed welding current.
Figure 16B:
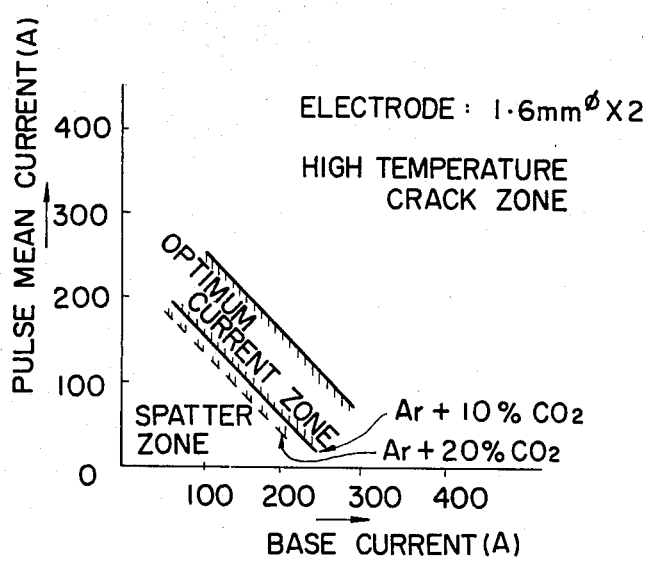

FIGS. 16(a) and 16(b) illustrate, based on the above described relations of the value of pulsed current with the degree of spattering and the production of high temperature cracks, optimum ranges of the pulsed current value which is free of high temperature cracks and in which spatters are not produced in such a degree as to hinder the narrow-gap welding operation.

It will be seen from FIG. 16 that, in the case of a stranded wire of two 2.0 mmφ wire elements, the effective value of pulsed current should be in the range of 350–450 A for a shielding gas composition of 80%Ar+20%CO$_2$ and in the range of 350–450 A for 90%Ar+10%CO$_2$ in order to ensure stable narrow-gap welding free of high temperature cracks. Further, in the case of a stranded wire of two 1.6 mmφ wire elements, the optimum range of the effective value of pulsed current for a shielding gas composition of 80%Ar+20%CO$_2$ is 250–350 A and that for 90%Ar+10%CO$_2$ is 230–350 A. Namely, optimum results are obtained by welding with pulsed current having an effective value at 70–90% of the critical value for spray transfer, which is 500 A for 2.0 mmφ×2 electrode and 400 A for 1.6 mmφ×2 electrode. A sound weld can also be obtained by using pulsed current only for the initial and second layers.

The foregoing embodiment of the invention is illustrated more particularly by the following Examples.

EXAMPLE 4

ASTM A516 GR70 100 mm thick steel plates with 0.25% C-content were welded by narrow-gap welding process of the following conditions. X-ray inspection, magnetic dust flaw detection and ultrasonic flaw detection of the resulting joint failed to find any defect such as cracks, incomplete fusion and the like.

| Base metal: | ASTM A516 Gr70 (100 mm thick) |
|---|---|
| Consumable electrode: | Two 50 kg/mm², 2.0 mm φ MIG wires for steels |
| Shielding gas: | 80% Ar + 20% $CO_2$ |
| Gap width: | 12–14 mm |
| Welding current: | Effective value of pulse current = 350–360A |
| Welding speed: | 25–30 cm/min |

EXAMPLE 5

ASTM A387 Gr 22 50 mm thick steel plates were joined by narrow-gap welding under the following conditions. X-ray inspection, magnetic dust flat detection and ultrasonic flaw detection failed to find any defect such as cracks, insufficient fusion and the like.

| Base metal: | ASTM A387 Gr22 (50 mm thick) |
|---|---|
| Consumable electrode: | Two 2.0 mm φ MIG wires for 2% Cr-1Mo steel |
| Shielding gas: | 90% Ar + 10% $CO_2$ |
| Gap width: | 10–11 mm |
| Welding current: | Pulsed current with effective value = 250–270A for 1st & 2nd layers; direct current for 3rd & succeeding layers. |
| Welding speed: | 30–40 cm/min |

EXAMPLE 6

JIS SB49 100 mm thick steel plates were welded by narrow-gap welding under the following conditions. X-ray inspection, magnetic dust flaw detection and ultrasonic flaw detection of the resulting joint failed to find any defect such as cracks, incomplete fusion and the like.

| Base metal: | JIS SB49 (100 mm thick) |
|---|---|
| Consumable electrode: | Two 50 kg/mm², 1.6 mm φ MIG wires for steels |
| Shielding gas: | 85% Ar + 15% $CO_2$ |
| Gap width: | 11–12 mm |
| Welding current: | Pulse current with effective value = 300–320A |
| Welding speed: | 30–35 cm/min |

In Examples 3 to 6, the welding torch was not inclined and held perpendicularly to the weld line.

As clear from the foregoing detailed description, in narrow-gap arc welding using a stranded wire electrode consisting of at least two wire elements, the present invention succeeded in stabilizing the arc while preventing high temperature cracks which are apt to occur in the initial and second layers, along with suppression of spatters.

Obviously, numerous modifications and variations of the present invention are possible in light of the above teachings. It is therefore to be understood that within the scope of the appended claims, the invention may be practiced otherwise than as specifically described herein.

What is claimed is:

1. An arc welding process which comprises:

forming a consumable stranded wire electrode by integrally intertwisting a plurality of wire elements substantially of the same sectional area such that the lines connecting center points of adjacent wire elements do not form a regular polygon in a sectional plane;

passing said consumable wire electrode through the interior of a hollow conducting tip having an inlet end, an outlet end and an inner periphery; and imparting a bending trait to said consumable wire electrode to contact said consumable wire electrode constantly with a surface on said inner periphery and at said outlet end of said conducting tip, providing an electrical potential between said tip and a material to be welded and directing said arc toward a center line of weld, wherein said consumable wire electrode is imparted with said bending trait with an amplitude of 5–60 mm when measured with respect to a segment forming an arc of 300 mm in length.

2. The process of claim 1, which further comprises carrying out said narrow-gap arc welding with direct current in the range of 450–500 A, a welding speed in the range of 15–23 cm/min, a forward inclination angle of the consumable electrode in the range of 5°–10° and a shielding gas mixture containing 2–15% of carbon dioxide or oxygen in addition to Ar.

3. The process of claim 1 wherein said consumable electrode comprises a first and second intertwisted wire element.

4. The process of claim 3 or 4, wherein said consumable stranded wire electrode comprises a sectional area of less than 9.1 mm².

5. The process of claim 3 or 4, wherein the ratio of H/W where H is the penetration depth and W is the bead width is less than 0.8.

6. The process of claim 4, wherein $G/2 \geq H_o \cdot \tan \theta \geq G/6$, where G is the gap width, of a gap to be welded $H_o$ the distance between the tip end of the consumable electrode and an intersecting point of bottom and side surface of the gap, and $\theta$ the twist angle of the first and second wire element.

7. The process of claim 1 which further comprises applying a pulsed current having an effective value 70–90% of a predetermined critical spray transfer current at least for the initial and second welding layers.

8. An arc welding process which comprises:

forming a consumable stranded wire electrode by integrally intertwisting a plurality of wire elements of different sectional areas such that the lines connecting center points of wire elements of larger diameter do not form a regular polygon in a sectional plane;

passing said consumable wire electrode through the interior of a hollow conducting tip having an inlet end, an outlet end and an inner periphery; and imparting a bending trait to said consumable wire electrode to contact said consumable wire electrode constantly with a surface on said inner periphery and at the outlet end of said conducting tip, providing an electrical potential between said tip and a material to be welded and directing said arc toward a center line of a weld, wherein said consumable wire electrode is imparted with said bending trait with an amplitude of 5–60 mm when measured with respect to a segment forming an arc of 300 mm in length.

9. The process of claim 8 which further comprises carrying out said narrow-gap arc welding with direct current in the range of 450–500 A, a welding speed in the range of 15–23 cm/min, a forward inclination angle of the consumable electrode in the range of 5°–10° and a shielding gas mixture containing 2–15 % of carbon dioxide or oxygen in addition to Ar.

10. The process of claim 8, wherein said consumable electrode comprises a first and second intertwisted wire element.

11. The process of claim 9 or 10, wherein said consumable stranded wire electrode comprises a sectional area of less than 9.1 mm$^2$.

12. The process of claim 9 or 10, wherein the ratio of H/W where H is the penetration depth and W is the bead width is less than 0.8.

13. The process of claim 3, wherein $G/2 \geq H_o \cdot \tan \theta \geq G/6$, where G is the gap width of a gap to be welded, $H_o$ the distance between the tip end of the consumable electrode and an intersecting point of bottom and side surface of the gap, and $\theta$ the twist angle of the first and second wire element.

14. The process of claim 8, which further comprises applying a pulse current having an effective value 70–90% of a predetermined critical spray transfer current at least for the initial and second welding layers.

* * * * *

UNITED STATES PATENT AND TRADEMARK OFFICE
CERTIFICATE OF CORRECTION

PATENT NO. : 4386259

DATED : May 31, 1983

INVENTOR(S) : Yasuhiro Nagai, et al.

It is certified that error appears in the above-identified patent and that said Letters Patent is hereby corrected as shown below:

In column 6, line 7, delete "seggregation" and insert therefor --segregation--;

In column 6, line 7, delete "Co2" and insert therefor --$CO_2$--;

In column 7, line 10 delete "adhead" and insert therefor --ahead--;

In column 7, line 53, delete "boudaries" and insert therefor --boundaries--;

In column 8, line 62, delete "ASTEM" and insert therefor --ASTM--;

In column 10, line 16, delete "$30°$" and insert therefor --$38°$--;

UNITED STATES PATENT AND TRADEMARK OFFICE
CERTIFICATE OF CORRECTION

PATENT NO. : 4386259
DATED : May 31, 1983
INVENTOR(S) : Yasuhiro Nagai, et al.

It is certified that error appears in the above-identified patent and that said Letters Patent is hereby corrected as shown below:

In column 10, line 56, delete "gage" and insert therefor --gauge--;

In column 12, line 65, delete "GR70" and insert therefor --Gr70--;

In column 13, line 17, delete "flat" and insert therefor --flow--;

In column 14, line 31, delete "3 or 4" and insert therefor --2 or 3--;

In column 14, line 34, delete "3 or 4" and insert therefor --2 or 3--;

In column 14, line 37, delete "4" and insert therefor -- 3 --.

Signed and Sealed this

Eleventh Day of October 1983

[SEAL]

Attest:

GERALD J. MOSSINGHOFF

*Attesting Officer*  *Commissioner of Patents and Trademarks*